US006159097A

United States Patent [19]

Gura

[11] Patent Number: 6,159,097

[45] Date of Patent: Dec. 12, 2000

[54] GAMING MACHINE WITH VARIABLE PROBABILITY OF OBTAINING BONUS GAME PAYOUTS

[75] Inventor: Damon E. Gura, Chicago, Ill.

[73] Assignee: WMS Gaming Inc., Chicago, Ill.

[21] Appl. No.: 09/343,798

[22] Filed: Jun. 30, 1999

[51] Int. Cl.[7] .............................. G07F 17/34; A63F 13/00

[52] U.S. Cl. .................... 463/20; 273/143 R; 273/138.2; 273/139

[58] Field of Search .................. 463/20, 16; 273/143 R, 273/138.2, 139

[56] References Cited

U.S. PATENT DOCUMENTS

| | | | |
|---|---|---|---|
| 3,281,149 | 10/1966 | Miller | 273/143 R |
| 4,095,795 | 6/1978 | Saxton et al. | 273/143 R |
| 4,306,768 | 12/1981 | Egging | 350/174 |

(List continued on next page.)

FOREIGN PATENT DOCUMENTS

| | | |
|---|---|---|
| 0 142 371 | 5/1985 | European Pat. Off. . |
| 0 148 001 | 7/1985 | European Pat. Off. . |
| 0 333 338 | 9/1989 | European Pat. Off. . |
| 0 577 415 A2 | 1/1994 | European Pat. Off. . |
| 1 474 617 | 4/1966 | France . |
| 37 00 861 | 7/1988 | Germany . |
| 40 14 477 | 7/1991 | Germany . |
| 1 129 607 | 10/1968 | United Kingdom . |
| 1 476 848 | 6/1977 | United Kingdom . |
| 1 591 623 | 6/1981 | United Kingdom . |
| 2 066 991 | 7/1981 | United Kingdom . |
| 2 072 395 | 9/1981 | United Kingdom . |
| 2 083 936 | 3/1982 | United Kingdom . |
| 2 084 371 | 4/1982 | United Kingdom . |
| 2 096 376 | 10/1982 | United Kingdom . |
| 2 097 160 | 10/1982 | United Kingdom . |
| 2 105 891 | 3/1983 | United Kingdom . |
| 2 106 685 | 4/1983 | United Kingdom . |
| 2 117 952 | 10/1983 | United Kingdom . |
| 2 147 442 | 5/1985 | United Kingdom . |

(List continued on next page.)

OTHER PUBLICATIONS

"Phantom Haus" Operations Manual, Williams Electronics Games, Inc., Jul. 1996.

Brochure of Monopoly SWP Game; JPM Ltd., 4 pgs.; date unknown.

WMS' Big Money Advertisement Sheet; WMS Gaming Inc.; 1 pg.; date unknown.

WMS' Piggy Bankin' Advertisement Sheet; WMS Gaming Inc.; 1 pg.; date unknown.

WMS' Pirate's Thunder Advertisement Sheet; WMS Gaming Inc.; 1 pg.; date unknown.

Bally Circus Ad, excerpt from "Lemons, Cherries and Bell Fruit Gum"; Richard M. Bueschel; 3 pgs.; date unknown.

(List continued on next page.)

*Primary Examiner*—Benjamin H. Layno
*Attorney, Agent, or Firm*—Jenkens & Gilchrist

[57] ABSTRACT

A gaming machine includes a basic game and a bonus game. The basic game is controlled by a processor in response to a wager amount and includes a plurality of different start-bonus outcomes. The bonus game is activated by the start-bonus outcomes which cause the processor to shift operation from the basic game to the bonus game. The bonus game is capable of providing a plurality of bonus payouts. In accordance with one feature of the gaming machine, a probability of winning certain ones of the bonus payouts varies in response to the different start-bonus outcomes that activate the bonus game. In accordance with another feature of the gaming machine, the bonus game includes a video-type display controlled by the processor and displaying a plurality of player-selectable elements, at least one of which represents a winning bonus game outcome. The player-selectable elements are successively selected by a player until the winning element is selected. In response to the selection of the winning element, the bonus game awards the player a bonus payout. The value of the bonus payout successively decreases in response to the player successively selecting the non-winning elements prior to selecting the winning element.

25 Claims, 9 Drawing Sheets

U.S. PATENT DOCUMENTS

| | | | |
|---|---|---|---|
| 4,335,809 | 6/1982 | Wain | 273/143 R |
| 4,448,419 | 5/1984 | Telnaes | 273/143 R |
| 4,508,345 | 4/1985 | Okada | 273/143 R |
| 4,624,459 | 11/1986 | Kaufman | 273/143 R |
| 4,721,307 | 1/1988 | Okada | 273/143 R |
| 4,763,256 | 8/1988 | DeMar | 364/410 |
| 4,772,023 | 9/1988 | Okada | 273/143 R |
| 4,805,907 | 2/1989 | Hagiwara | 273/138.2 |
| 4,871,171 | 10/1989 | Rivero | 273/138.2 |
| 5,083,785 | 1/1992 | Okada | 273/143 R |
| 5,169,147 | 12/1992 | Hamano | 273/138.2 |
| 5,205,555 | 4/1993 | Hamano | 273/143 R |
| 5,259,616 | 11/1993 | Bergmann | 273/138.2 |
| 5,292,127 | 3/1994 | Kelly et al. | 273/138.2 |
| 5,342,047 | 8/1994 | Heidel et al. | 273/138.2 |
| 5,342,049 | 8/1994 | Wichinsky et al. | 273/138.2 |
| 5,380,008 | 1/1995 | Mathis et al. | 273/143 R |
| 5,393,057 | 2/1995 | Marnell, II | 273/143 R |
| 5,401,024 | 3/1995 | Simunek | 273/138.2 |
| 5,415,404 | 5/1995 | Joshi et al. | 273/138.2 |
| 5,429,361 | 7/1995 | Raven et al. | 273/138.2 |
| 5,449,173 | 9/1995 | Thomas et al. | 273/143 R |
| 5,456,465 | 10/1995 | Durham | 273/138.2 |
| 5,456,466 | 10/1995 | Miles . | |
| 5,542,669 | 8/1996 | Charron et al. | 463/13 |
| 5,547,192 | 8/1996 | Ishibashi | 463/26 |
| 5,624,119 | 4/1997 | Leake | 273/269 |
| 5,647,798 | 7/1997 | Falciglia | 463/19 |
| 5,664,781 | 9/1997 | Feola | 273/292 |
| 5,697,843 | 12/1997 | Manship et al. | 463/20 |
| 5,704,835 | 1/1998 | Dietz, II | 463/20 |
| 5,722,891 | 3/1998 | Inoue | 463/20 |
| 5,779,545 | 7/1998 | Berg et al. | 463/22 |
| 5,788,573 | 8/1998 | Baerlocher et al. | 463/16 |
| 5,823,874 | 10/1998 | Adams | 463/17 |
| 5,848,932 | 12/1998 | Adams | 463/20 |
| 5,951,397 | 9/1999 | Dickinson | 463/36 |

FOREIGN PATENT DOCUMENTS

| | | |
|---|---|---|
| 2 147 773 | 5/1985 | United Kingdom . |
| 2 152 262 | 7/1985 | United Kingdom . |
| 2 153 572 | 8/1985 | United Kingdom . |
| 2 157 047 | 10/1985 | United Kingdom . |
| 2 165 385 | 4/1986 | United Kingdom . |
| 2 170 636 | 8/1986 | United Kingdom . |
| 2 180 087 | 3/1987 | United Kingdom . |
| 2 181 589 | 4/1987 | United Kingdom . |
| 2 183 882 | 6/1987 | United Kingdom . |
| 2 191 030 | 12/1987 | United Kingdom . |
| 2 197 974 | 6/1988 | United Kingdom . |
| 2 202 984 | 10/1988 | United Kingdom . |
| 2 204 436 | 11/1988 | United Kingdom . |
| 2 210 191 | 6/1989 | United Kingdom . |
| 2 222 712 | 3/1990 | United Kingdom . |
| 2 226 907 | 7/1990 | United Kingdom . |
| 2 229 565 | 9/1990 | United Kingdom . |
| 2 230 373 | 10/1990 | United Kingdom . |
| 2 233 806 | 1/1991 | United Kingdom . |
| 2 242 300 | 9/1991 | United Kingdom . |
| 2 253 154 | 9/1992 | United Kingdom . |
| 2 262 642 | 6/1993 | United Kingdom . |
| 2 270 787 | 3/1994 | United Kingdom . |
| 2 273 384 | 8/1994 | United Kingdom . |
| 2 287 567 | 9/1995 | United Kingdom . |
| 2 297 857 | 8/1996 | United Kingdom . |
| 2 298 508 | 9/1996 | United Kingdom . |
| WO 8808179 | 10/1988 | WIPO . |
| WO 8912875 | 12/1989 | WIPO . |
| WO 9210818 | 6/1992 | WIPO . |
| WO 9401840 | 1/1994 | WIPO . |

OTHER PUBLICATIONS

Bally Bingo Ad, excerpt from "Lemons, Cherries and Bell Fruit Gum"; Richard M. Bueschel; 1 pg.; date unknown.

Las Vegas Slot Machine Ad, excerpt from "Lemons, Cherries and Bell Fruit Gum"; Richard M. Bueschel; 1 pg.; date unknown.

Phantom Haus website publication; Williams Electronics Games, Inc.; 2 pgs.; date unknown.

Arabian Riches website publication; Silicon Gaming Inc.; 2 pgs.; date Jul. 17, 1998.

Buccaneer Gold website publication; Silicon Gaming Inc.; 2 pgs.; date Jul. 17, 1998.

Fort Knox website publication; Silicon Gaming Inc.; 2 pgs.; date Jul. 17, 1998.

Lady of Fortune website publication; Silicon Gaming Inc.; 2 pgs.; date Jul. 17, 1998.

Riddle of the Sphinx website publication; Silicon Gaming Inc.; 2 pgs.; date Jul. 17, 1998.

Information Sheets for Kaleidoscope game; Williams Electronics Games, Inc.; 3 pgs.; date unknown.

Information Sheets for Double Wild & Loose Game; Williams Electronics Games, Inc.; 3 pgs.; date unknown.

Information Sheets for Wild Cherry (120A) Game; International Game Technology.; 2 pgs.; date Nov. 7, 1994.

Information Sheets for Double Wild Cherry (195A) Game; International Game Technology.; 3 pgs.; date Nov. 7, 1994.

Chapters 10, 11, 12; excerpts from "Lemons, Cherries and Bell–Fruit–Gum"; Richard M. Bueschel; 71 pgs.; 1995.

Advertisement, Club Vegas, Barcrest; 1 pg.; date unknown.

Advertisement, Viva Club Vegas!, Barcrest; 1 pg.; date unknown.

Advertisement, "Monopoly: Maygay There for the Takings"; 2 pgs.; date unknown.

Advertisement, "The Big Breakfast"; Channel Four Television Corporation; 2 pgs.; 1993.

Advertisement, "Midas Touch"; 2 pgs.; date unknown.

Advertisement, "Acropolis"; Automatic (Fruit) Designs, Ltd.; 2 pgs.; date unknown.

Advertisement, "Adders & Ladders"; Barcrest; 2 pgs.; date unknown.

Advertisement, "The Wild West"; Bell–Fruit Manufacturing; 2 pgs.; date unknown.

Advertisement, "Premier Club Manager"; Bell–Fruit Manufacturing; 2 pgs.; date unknown.

Advertisement, "Fortune Wheel"; Project Customer Services; 2 pgs., date unknown.

Advertisement, "Road Hog"; Barcrest; 2 pgs.; date unknown.

Advertisement, "Viva! Six ! Las Vegas"; Barcrest; 2 pgs.; date unknown.

Advertisement, "Golden Circle"; Delta Automaten; 1 pg.; date unknown.

Advertisement, "Club Double"; M–D–M Coin Sales Ltd.; 2 pgs.; date unknown.

Advertisement, "Treasure Island"; American Alpha, Inc.; 1 pg.; date unknown.

Advertisement, "Bonus Card"; Andries Robert Automatic s.p.r.l.; 1 pg.; date unknown.

Advertisement, "Super Square"; Maygay Machines Ltd.; 2 pgs.; date unknown.

Advertisement, "Lucky Bank"; 1 pg.; date unknown.

Advertisement, "Happy Clown"; Andries Robert Automatic s.p.r.l.; 1 pg.; date unknown.
Advertisement, "Jackpot Stampede"; WMS Gaming Inc., 2 pgs.; date unknown.
Brochure, "Perfect Universal Slot Machines"; Universal Co., Ltd.; 16 pgs.; date unknown.
Advertisement, "Club Make a Million"; Bell–Fruit Manufacturing Co., Ltd.; 2 pgs.; date unknown.
Advertisement, "Instant Jackpots"; Bell–Fruit Manufacturing Co., Ltd.; 2 pgs.; date unknown.
Cover page, "Enter Disposable Gaming"; Euroslot. The International Coin–Operated Machine Journal; 1 pg.; Apr. 1994.
Advertisement. Barcrest Limited; 1 pg.; date unknown.
Cover page, "Covers Your World"; Euroslot. The Currency of the Coin Machine Industry; 1 pg.; date unknown.
Article, "Bangkok on the Brink"; Euroslot. The International Coin–Operated Machine Journal; 2 pgs.; Nov. 1993.
Article, "Scandinavia on the Brink of the EU melting pot"; Euroslot. The International Coin–Operated Machine Journal; 2 pgs.; Aug. 1994.
Advertisement, "Only Fools and Horses"; Bell–Fruit Manufacturing Co., Ltd.; 2 pgs.; date unknown.
Advertisement, "Main Attraction"; Bell–Fruit Manufacturing Co., Ltd., 2 pgs.; date unknown.
Brochure, "World Players"; Barcrest; 6 pgs.; date unknown.
Brochure, "JPM Presents Monoploy Deluxe"; JPM International Ltd., 5 pgs.; date unknown.
Brochure, "The 50th Show"; Ate International; 2 pgs.; Jan. 1994.
Advertisement, "Colossus"; AFD.; 1 pg.; date unknown.
Advertisement, "Wheel of Fortune"; Project Creating Entertainment; 2 pgs.; date unknown.
Advertisement, "Lucky Horseshoes"; JPM Automatic Machines Ltd.; 2 pgs.; date unknown.
Advertisement, "Lucky Jackpots"; JPM Automatic Machines Ltd.; 2 pgs. date unknown.
Advertisement, "Monopoly"; JPM Automatic Machines Ltd.; 2 pgs.; date unknown.

*Fig. 10*

| SELECTION IN WHICH GUILTY CHARACTER IS FOUND | PRIMARY BONUS (VALUE IS MULTIPLIED BY NUMBER OF ACTIVE PAYLINES) |
|---|---|
| 1 | 250 |
| 2 | 200 |
| 3 | 150 |
| 4 | 100 |
| 5 | 80 |
| 6 | 70 (UNAVAILABLE WHEN THREE SIDEKICK SYMBOLS IN START-BONUS OUTCOME) |
| 7 | 50 (UNAVAILABLE WHEN TWO OR MORE SIDEKICK SYMBOLS IN START-BONUS OUTCOME) |
| 8 | 30 (UNAVAILABLE WHEN ONE OR MORE SIDEKICK SYMBOLS IN START-BONUS OUTCOME) |

*Fig. 11*

| SELECTION IN WHICH HIDING PLACE IS FOUND | MULTIPLIER (APPLIED TO TOTAL BONUS PAYOUT TO THAT POINT IN THE BONUS GAME) |
|---|---|
| 1 | X8 |
| 2 | X5 |
| 3 | X4 |
| 4 | X3 |
| 5 | X2 |

GAMING MACHINE WITH VARIABLE PROBABILITY OF OBTAINING BONUS GAME PAYOUTS

FIELD OF THE INVENTION

The present invention relates generally to gaming machines and, more particularly, to a gaming machine having a bonus game in which the probability of inning certain bonus payouts varies in response to different start-bonus outcomes on a basic game which trigger the bonus game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept which has been successfully employed to enhance the entertainment value of a game is the concept of a "secondary" or "bonus" game which may be played in conjunction with a "basic" game. The bonus game may comprise any type of game, either similar to or completely different from the basic game, which is entered upon the occurrence of a selected event or outcome of the basic game. The bonus game concept is the subject of U.S. parent patent application Ser. Nos. 08/835,840 ("the '840 application") filed Apr. 23, 1997 and U.S. patent application Ser. No. 09/140,947 ("the '947 application") filed Aug. 27, 1998, both of which are assigned to the assignee of the present application and incorporated herein by reference in their entireties. The '840 and '947 applications disclose an embodiment wherein the basic game is a reel-type slot machine and the bonus game is a simulated reel-type slot machine implemented on a video-type display. The bonus game is entered upon the appearance of a special symbol combination of start-bonus symbols on the reels of the slot machine in the basic game. In the bonus game of the '840 and '947 applications, the probability of winning combinations appearing on the reels, or the "hit rate," is much greater than that of the basic game. The player is permitted to keep playing and accumulate winnings from the bonus game until a losing trial occurs. Such a bonus game produces a significantly higher level of player excitement than the basic game because it provides a greater expectation of winning than the basic game and is accompanied with more attractive or unusual video displays and/or audio.

Because the bonus game concept offers tremendous advantages in player appeal and excitement relative to other known games, and because such games are attractive to both players and operators, there is a continuing need to develop new features for bonus games to satisfy the demands of players and operators. Preferably, such new bonus game features will maintain, or even further enhance, the level of player excitement offered by bonus games heretofore known in the art. The present invention is directed to satisfying these needs.

SUMMARY OF THE INVENTION

A gaming machine includes a basic game and a bonus game. The basic game is controlled by a processor in response to a wager amount and includes a plurality of different start-bonus outcomes. The bonus game is activated by the start-bonus outcomes which cause the processor to shift operation from the basic game to the bonus game. The bonus game is capable of providing a plurality of bonus payouts. In accordance with one feature of the gaming machine, a probability of winning certain ones of the bonus payouts varies in response to the different start-bonus outcomes that activate the bonus game. In accordance with another feature of the gaming machine, the bonus game includes a video-type display controlled by the processor and displaying a plurality of player-selectable elements, at least one of which represents a winning bonus game outcome. The player-selectable elements are successively selected by a player until the winning element is selected. In response to the selection of the winning element, the bonus game awards the player a bonus payout. The value of the bonus payout successively decreases in response to the player successively selecting the non-winning elements prior to selecting the winning element.

BRIEF DESCRIPTION OF THE DRAWINGS

The foregoing and other advantages of the invention will become apparent upon reading the following detailed description and upon reference to the drawings in which:

FIG. 10 is a pay table for a primary bonus awarded for finding a guilty character from suspects shown on the display screen capture in FIGS. 5–8, where the number of suspects depends upon the start-bonus outcome that triggered the bonus game; and FIG. 11 is a multiplier table for a payout multiplier for finding a hiding place of the guilty character in a hideout shown on the display screen capture in FIG. 9, where the number of hiding places depends upon the start-bonus outcome that triggered the bonus game.

Figure 1:
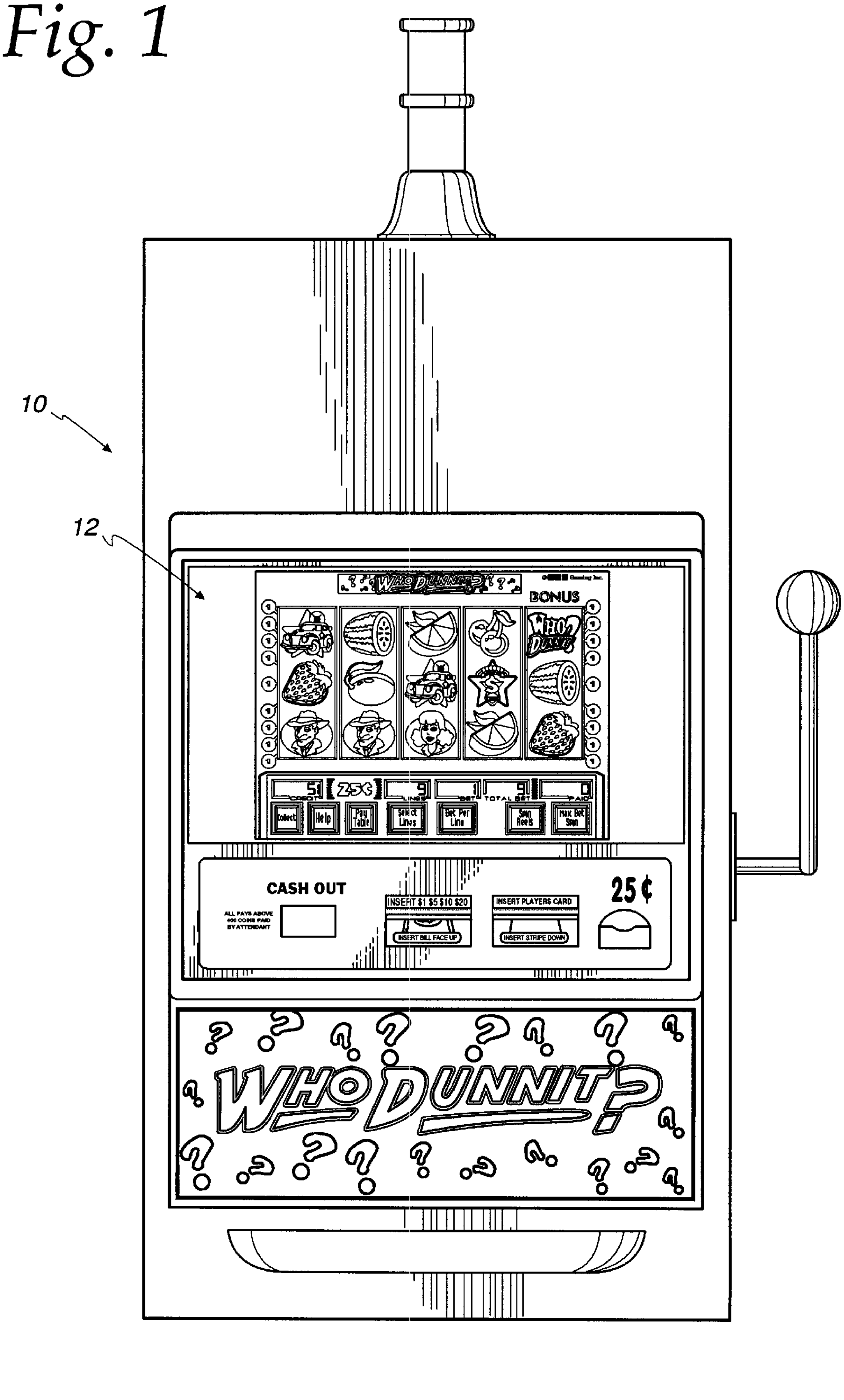
FIG. 1 is a simplified front view of a slot machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a video gaming machine 10 that may be used to implement a bonus game according to the present invention. The gaming machine 10 includes a video display 12 that may comprise a dot matrix, CRT, LED, LCD, electro-luminescent display or generally any type of video display known in the art. In the illustrated embodiment, the gaming machine 10 is an "upright" version in which the video display 12 includes a touch screen and is oriented vertically relative to the player. It will be appreciated, however, that any of several other models of gaming machines are within the scope of the present invention including, for example, a "slant-top" version in which the video display is slanted at about a thirty-degree angle toward the player, or gaming machines that include mechanical rather than video displays.

In one embodiment, the gaming machine 10 is operable to play a game entitled WHO DUNNIT?™ having a mystery theme. The WHO DUNNIT?™ game features a basic game in the form of a slot machine with five simulated spinning reels (see FIG. 3) and a bonus game with strategy options directing game activities on the video display 12. It will be appreciated, however, that the gaming machine 10 may be implemented with games other than the WHO DUNNIT?™ game and/or with any of several alternative game themes.

Figure 2:
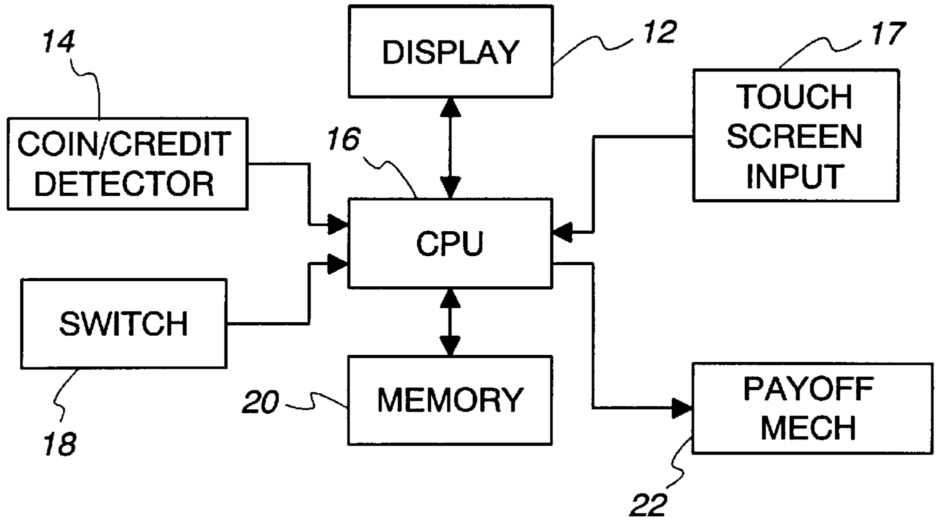
FIG. 2 is a block diagram of a control system suitable for operating the gaming machine in FIG. 1.

FIG. 2 is a block diagram of a control system suitable for operating the gaming machine 10. Coin/credit detector 14 signals a CPU 16 when a player has inserted a number of coins or played a number of credits. Then, the CPU 16 operates to execute a game program which causes the video display 12 to display the basic game that includes simulated reels with symbols displayed thereon (see FIG. 3). The player may select the number of paylines to play and the amount to wager via touch screen input keys 17. The basic game commences in response to the player activating a switch 18 (e.g., by pulling a lever or pushing a button), causing the CPU 16 to set the reels in motion, randomly select a game outcome and then stop the reels to display symbols corresponding to the pre-selected game outcome. In one embodiment, certain of the basic game outcomes cause the CPU 16 to enter a bonus mode causing the video display 12 to show a bonus game. The display screens associated with the WHO DUNNIT™ bonus game will be described in detail in relation to FIGS. 5 through 9.

A system memory 20 stores control software, operational instructions and data associated with the gaming machine 10. In one embodiment, the memory 20 comprises a separate read-only memory (ROM) and battery-backed random-access memory (RAM). However, it will be appreciated that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes which might occur in the basic game or bonus game. The payoff amounts corresponding to certain combinations of symbols in the basic game is predetermined according to a pay table stored in system memory 20. The payoff amounts corresponding to certain outcomes of the bonus game are also stored in system memory 20.

Figure 3:
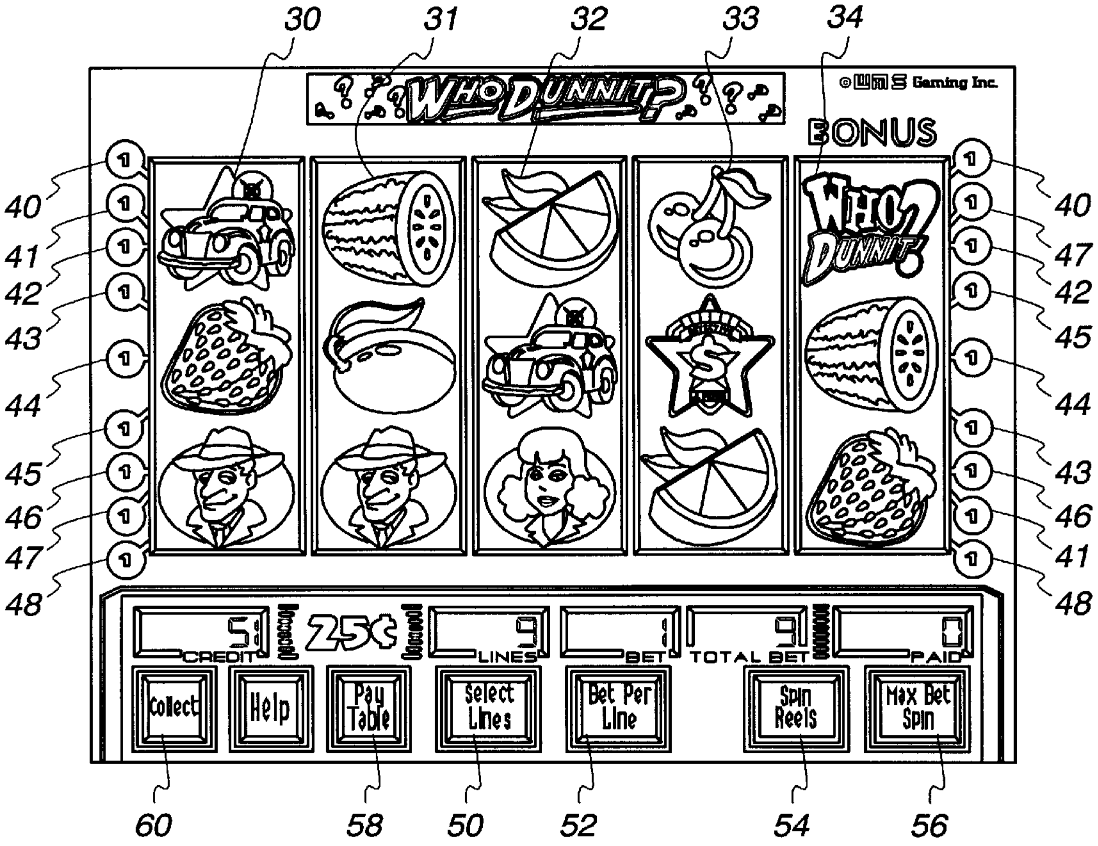
FIG. 3 is a display screen capture associated with a five-reel, nine-line basic game that is played on the gaming machine in FIG. 1.

As shown in FIG. 3, the WHO DUNNIT?™ basic game is implemented on the video display 12 on five video simulated spinning reels 30, 31, 32, 33 and 34 (hereinafter "reels") with nine paylines 40–48. Each of the paylines 40–48 extend through one symbol on each of the five reels 30–34. Generally, game play is initiated by inserting a number of coins or playing a number of credits, causing the CPU 16 (FIG. 2) to activate a number of paylines corresponding to the number of coins or credits played. In one embodiment, the player selects the number of paylines (between one and nine) to play by pressing a "Select Lines" key 50 on the video display 12. The player then chooses the number of coins or credits to bet on the selected paylines by pressing the "Bet Per Line" key 52.

After activation of the paylines, the reels 30–34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU 16 uses a random number generator (not shown) to select a game outcome (e.g., "basic" game outcome) corresponding to a particular set of reel "stop positions." The CPU 16 then causes each of the video reels 30–34 to stop at the appropriate stop position. Video symbols are displayed on the reels 30–34 to graphically illustrate the reel stop positions and indicate whether the stop positions of the reels represent a winning game outcome. Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30–34 along an active payline correspond to one of the winning combinations on the pay table. If the displayed symbols stop in a winning combination, the game credits the player an amount corresponding to the award in the pay table for that combination multiplied by the amount of credits bet on the winning payline. The player may collect the amount of accumulated credits by pressing the "Collect" button 60.

Figure 4A:
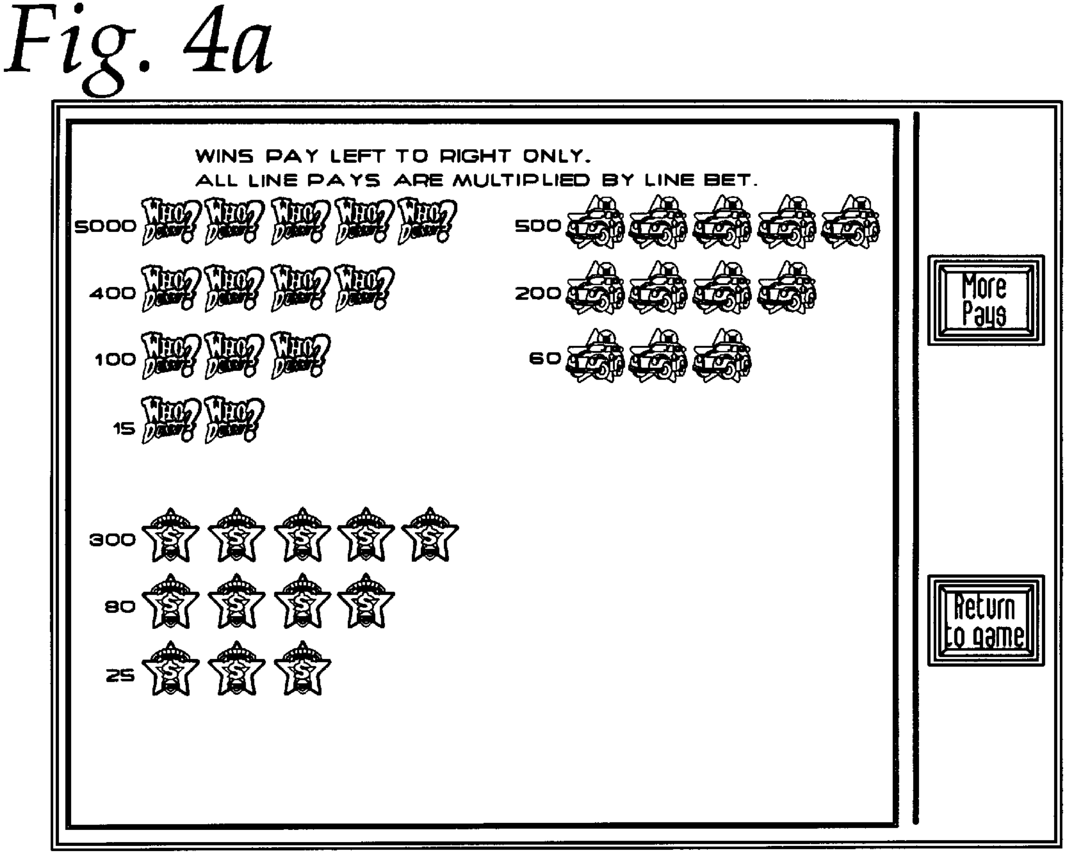
FIGS. 4*a* and 4*b* are a pay table for various winning symbol combinations that may occur in the basic game of the gaming machine in FIG. 1.
Figure 4B:
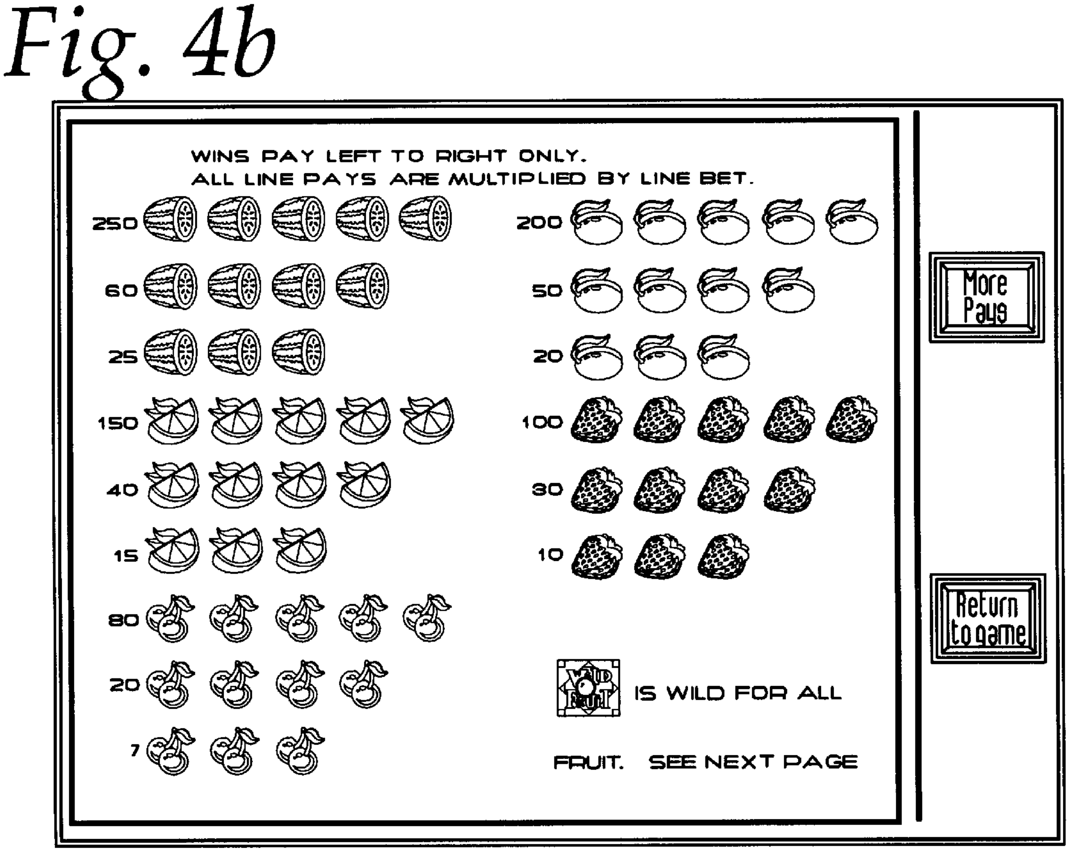

FIGS. 4*a* and 4*b* depict the pay table for the WHO DUNNIT?™ basic game. The pay table enables the player to view the winning combinations and their associated payoff amounts. From the pay table it can be seen that the WHO DUNNIT?™ basic game includes the following reel symbols that can lead to a payoff in the basic game: WHO DUNNIT, DETECTIVE CAR, BADGE, CHERRY, MELON, PLUM, ORANGE, STRAWBERRY, and MAGNIFYING GLASS.

Included among the plurality of basic game outcomes are a plurality of different start-bonus outcomes for starting play of a bonus game. A start-bonus outcome may be defined in any number of ways. For example, a start-bonus outcome occurs when a special start-bonus symbol or a special combination of symbols appears on one or more of the reels 30–34 in any predetermined display position. The appearance of a start-bonus outcome causes the processor to shift operation from the basic game to a bonus game.

The WHO DUNNIT?™ bonus game is triggered by lining up three DETECTIVE symbols, three SIDEKICK symbols, or any mix of three of these start-bonus symbols on an active payline. In other words, the start-bonus outcomes are the following combinations of start-bonus symbols appearing, in any order, on an active payline: (1) DETECTIVE, DETECTIVE, DETECTIVE; (2) DETECTIVE, DETECTIVE, SIDEKICK; (3) DETECTIVE, SIDEKICK, SIDEKICK; and (4) SIDEKICK, SIDEKICK, SIDEKICK. In FIG. 3, for example, the combination DETECTIVE (reel 30), DETECTIVE (reel 31), SIDEKICK (reel 32) is on the payline 46. If that payline is active, the bonus game would be triggered. In the illustrated embodiment, the DETECTIVE and SIDEKICK symbols do not appear in the pay table in FIG. 4 and, therefore, cannot generate a winning basic game outcome. These symbols, however, do provide start-bonus outcomes for triggering the WHO DUNNIT?™ bonus game.

Figure 5:
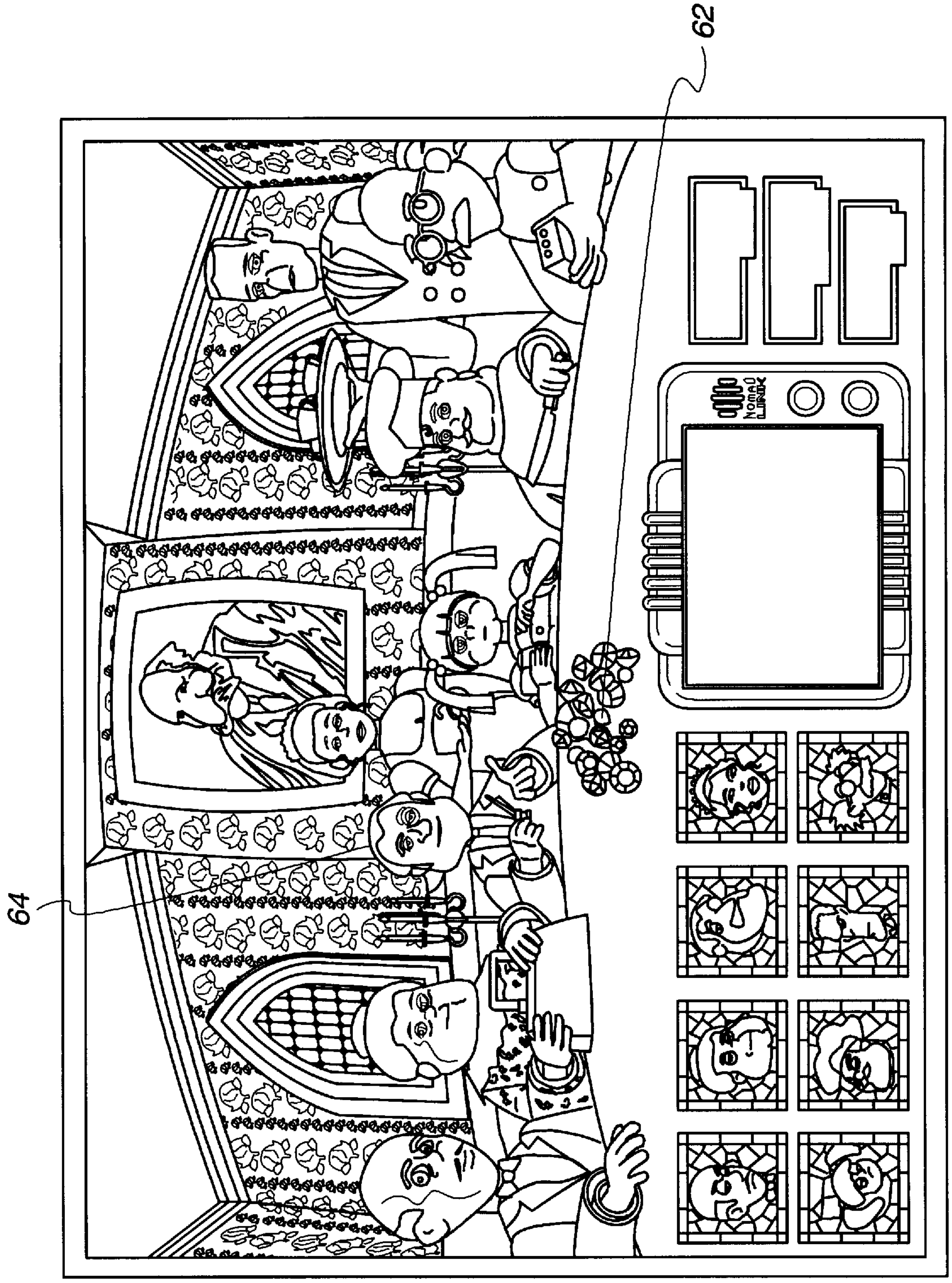
FIGS. 5 through 9 are display screen captures associated with a bonus game with mystery.

In response to starting the WHO DUNNIT?™ bonus game, the video display 12 shows the bonus game screen in FIG. 5. The scene on the bonus screen includes eight different characters around a table, some seated and some standing. The characters may, for example, include a Shady Lawyer, Butler, French Maid, Italian Chef, Old Lady (the Widow), Accountant, Professor (Mad Scientist), and Little Girl. Placed in the center of the table will be some item of value 62. The scene may be thought of as a will being read by an attorney, and all the appropriate members have been gathered to divide up the estate. In summary, the item is stolen by one of the members that are at the table and a player of the gaming machine becomes the detective who must now solve this crime. The object for the player is to take as few selections as possible to reveal the guilty character to the rest of the group. The fewer the selections, the greater the bonus.

Prior to the item being stolen, the characters are in a NORMAL MODE. The characters may "blink" their eyes but they essentially carry expressions of indifference. The Shady Lawyer 64 then gives a short introductory speech like "We're here to distribute the estate of . . . " During this speech one or two of the characters may wink to give the player a false sense of knowledge about who committed the crime.

After the Shady Lawyer 64 finishes his speech the video display turns black to indicate a "blackout" and then flashes lightning through windows. The light generated from the lightning highlights the characters. The player hears a scream, footsteps, and a door slam at which time the screen fades back up to its normal lighting. The item that used to be in the center of the table is now missing.

Figure 6:
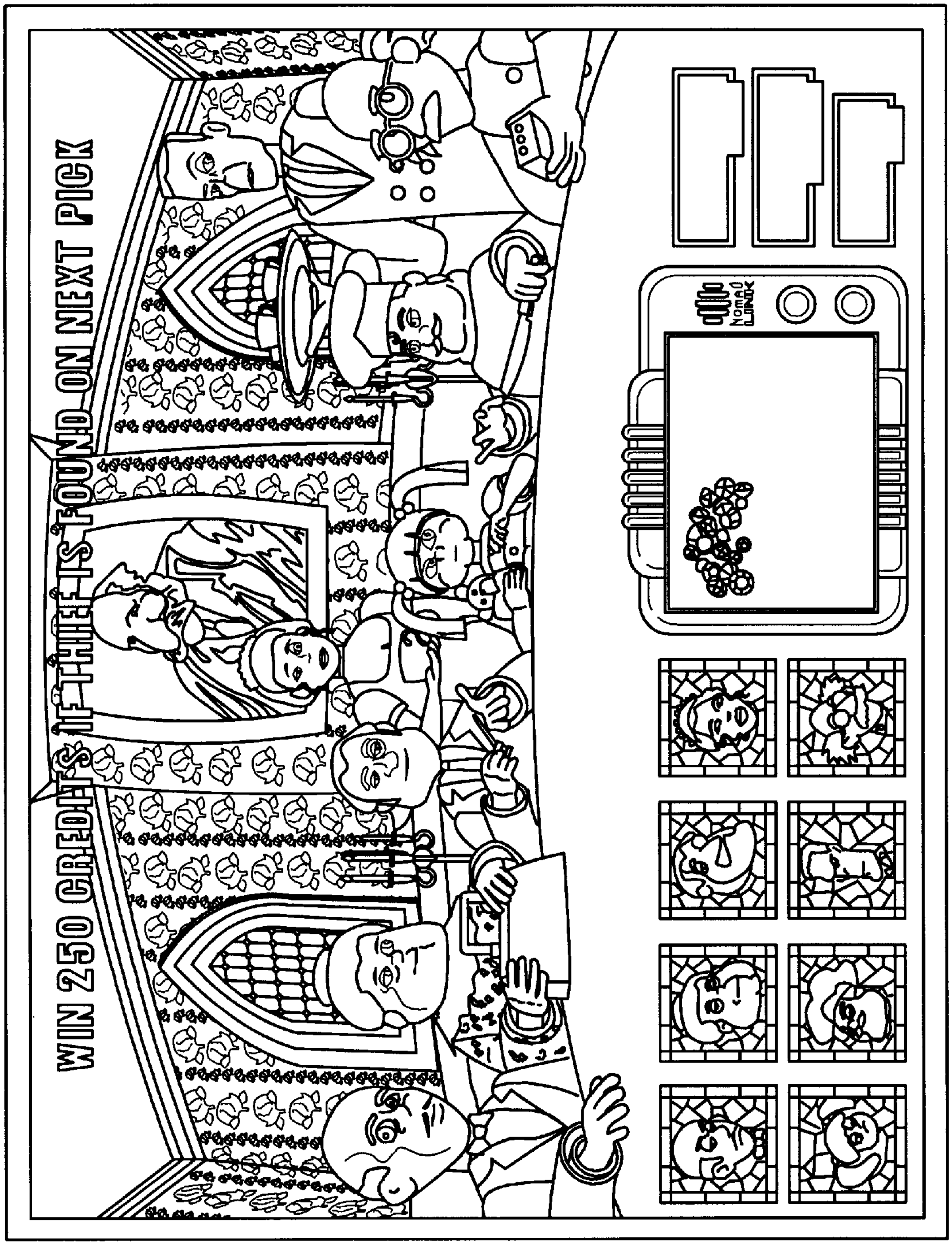

FIG. 6 depicts the bonus game screen after the item has been stolen. The characters are now in a SUSPECT MODE. In this mode the characters have suspicious facial expressions with shifting eyes avoiding eye contact with the player. Some of the characters may perform some kind of idle animation to make them appear guilty. For example, the Italian Chef may fiddle with his knife; the Old Lady may clench her purse; the Professor may click his stopwatch; the Little Girl may play with her teddy bear; and the Shady Lawyer may tap a pen on his hand.

Figure 7:
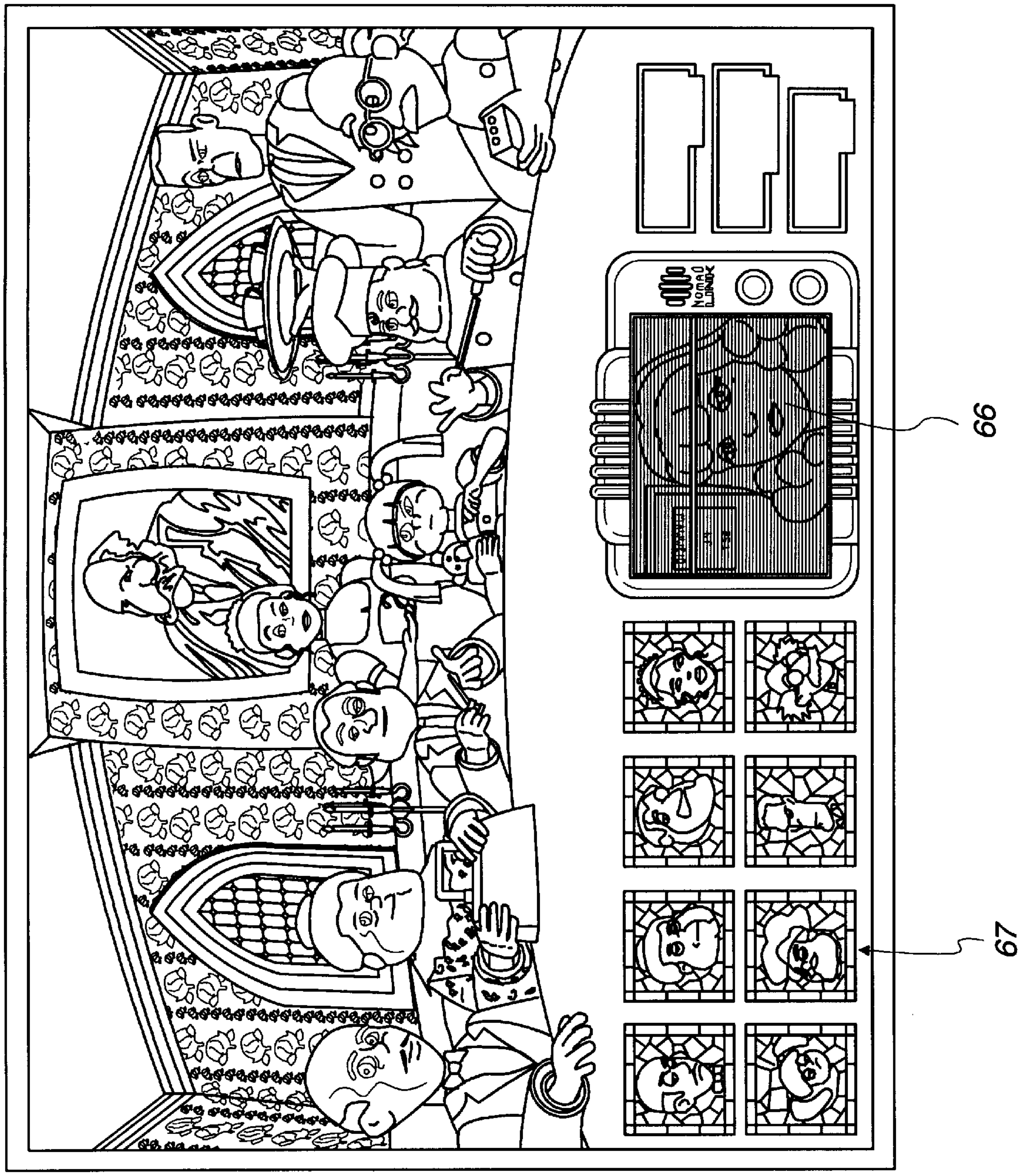

Referring to FIG. 7, if the WHO DUNNIT?™ bonus game was triggered by a start-bonus outcome including one or more SIDEKICK symbols, then a sidekick character 66 appears on the video display. At this time the sidekick character 66 eliminates X number of the characters by proclaiming them innocent and removing them from the suspect list, where X is equal to the number of SIDEKICK symbols in the start-bonus outcome that triggered the bonus game. For example, if the startbonus outcome was the combination DETECTIVE, DETECTIVE, SIDEKICK in any order (see FIG. 3), then one of the eight characters is removed from the suspect list. If the start-bonus outcome was the combination DETECTIVE, SIDEKICK, SIDEKICK in any order, then two of the eight characters are removed from the suspect list. Finally, if the start-bonus outcome was the combination SIDEKICK, SIDEKICK, SIDEKICK, then three of the eight characters are removed from the suspect list. If, however, the start-bonus outcome consisted solely of the combination of three DETECTIVE symbols, then the sidekick character 66 does not emerge.

Next, game control is transferred to the player, who can select a character that he or she believes is guilty. Alternatively, the bonus game screen may include a menu panel 67 with color icons of five, six, seven, or eight characters (depending upon the number of SIDEKICK symbols in the start-bonus outcome), and the player may select the character's icon in the menu panel. Icons of any characters removed from the suspect list by the sidekick character 66 are preferably grayed out or not shown. This gives the player the flexibility of either choosing the character directly or using the character's icon to make the player's choice. The fewer selections it takes the player to find the guilty character, the greater the bonus.

Figure 8:
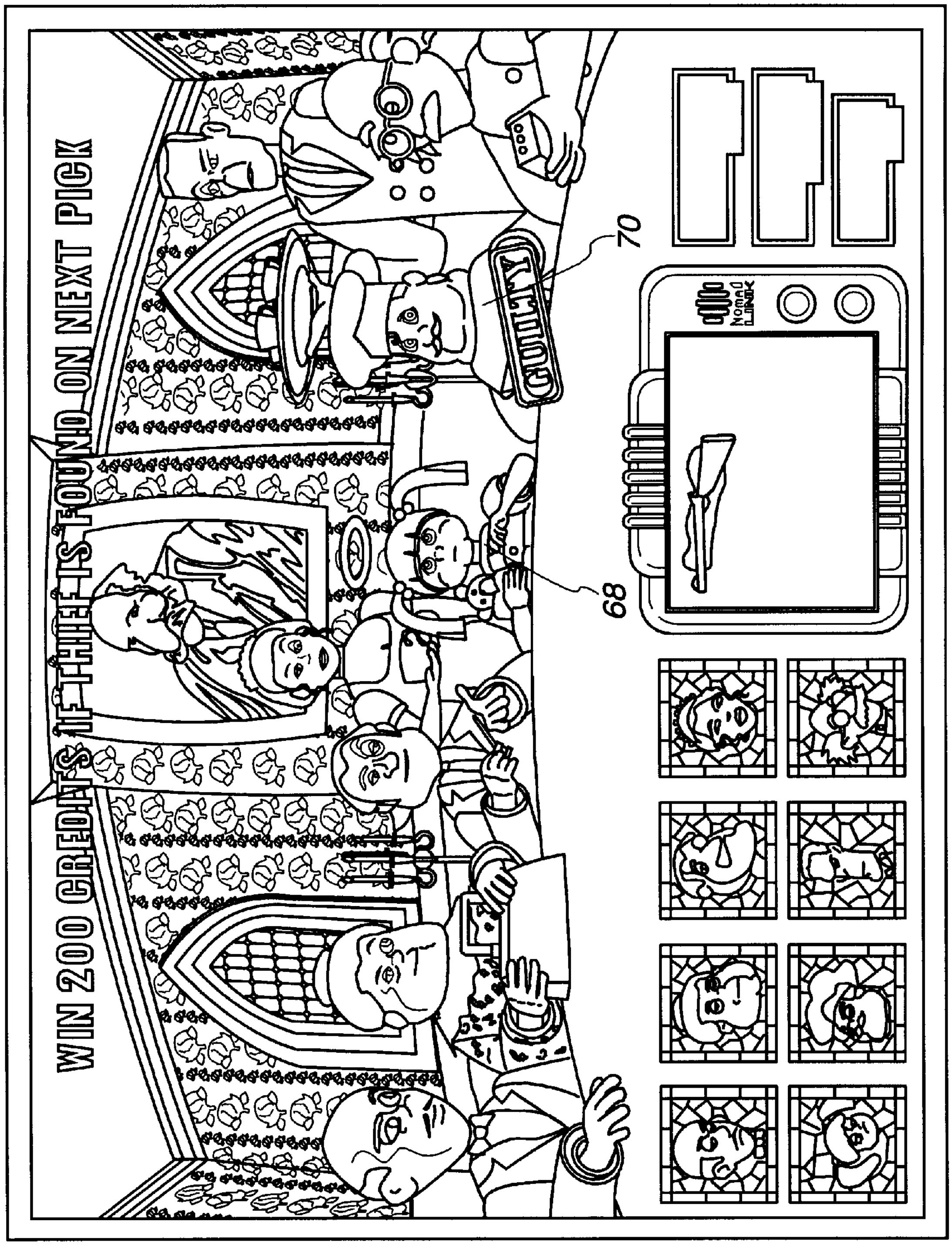

There are two possible outcomes once a character is chosen by the player—the character is either innocent or guilty. If the character is innocent then the character undergoes an animated transition to innocence. Specifically, the character's icon from the menu panel is disabled, a new sprite is placed over top the character with a brighter lighting, and a halo is put above the character's head. The character may also speak one of three different phrases such as "I told you I didn't do it." The innocent character cannot be chosen again. In FIG. 8 the Little Girl 68 has undergone a transition to innocence.

If the selected character is guilty then the guilty character speaks one of three guilty phrases, is stamped guilty, and is given an appropriate facial expression. In FIG. 8 the Italian Chef 70 has undergone a transition to guilty. At this point, the processor occasionally triggers one or more additional bonus features discussed below. If, however, none of these bonus features is triggered, the processor ends the bonus game and awards a primary bonus to the player. The video display may accompany the award of the primary bonus with animations celebrating the capture of the guilty suspect.

The three additional bonus features that can be triggered prior to awarding the primary bonus immediately upon selecting the guilty character are an accomplice feature, an additional stolen item feature, and a go-to-suspect's-hideout feature. Although the CPU is programmed such that it is highly unlikely for more than one of these bonus features to occur in the bonus game, it is possible for one, two, or all three of these features to occur in the bonus game.

In the accomplice feature, the guilty character has an accomplice who the layer must find for a supplemental bonus. The player finds the accomplice by continuing to select the characters as described above until the accomplice is found. Finding the accomplice adds the supplemental bonus to the primary bonus that was already awarded for finding the guilty character.

In the additional stolen item feature, the guilty character has another stolen item on him or her, such as another character's wallet, that awards the player with a supplemental bonus in addition to the primary bonus already awarded for finding the guilty character.

In the go-to-suspect's-hideout feature, which occurs very rarely, the guilty character says "I did it but you've got to catch me first" and flees the scene of the crime to his or her hideout. The player is then taken to the bonus screen in FIG. 9, which shows the guilty character's hideout with highlights around key areas such as a closet, table, chest, window, stove, trapdoor in the floor, etc. These highlights represent possible hiding places for the guilty character. The object of this bonus feature is to find the hiding place of the guilty character in as few selections as possible. The fewer the number of selections it takes the player to find the hiding place of the guilty character, the greater a payout multiplier. Finding the hiding place of the guilty character applies the multiplier to the total payout (including any basic and bonus game payouts) that were already awarded to the player.

Referring now to FIG. 10, there is shown a pay table for the primary bonus awarded for finding the guilty character from the suspects shown on the display screen captures in FIGS. 5–8. The player is awarded a primary bonus based on the number of selections required to find the guilty character. The fewer the number of selections it takes the player to find the guilty character, the greater the primary bonus. If a player finds the guilty character with his or her first selection, the player is awarded a primary bonus of 250 credits multiplied by the number of active paylines; if the player finds the guilty character with his or her second selection, the player is awarded a primary bonus of 200 credits multiplied by the number of active paylines; if the player finds the guilty character with his or her third selection, the player is awarded a primary bonus of 150 credits multiplied by the number of active paylines; and so on.

As discussed above, the number of selectable suspects is reduced by one for each SIDEKICK symbol appearing in the start-bonus outcome that triggered the bonus game. Therefore, the number of available primary bonuses is reduced by one, starting from the lowest primary bonus appearing in the pay table, for each SIDEKICK symbol appearing in the start-bonus outcome. For example, if the start-bonus outcome includes one SIDEKICK symbol, the lowest primary bonus of 30 credits per active payline is unavailable to the player; if the start-bonus outcome includes two SIDEKICK symbols, the two lowest primary bonuses of 30 and 50 credits per active payline are unavailable to the player; and if the start-bonus outcome includes three SIDEKICK symbols, the three lowest primary bonuses of 30, 50, and 70 credits per active payline are unavailable to the player. In other words, each SIDEKICK symbol in the start-bonus outcome successively removes a primary bonus from the hierarchy of primary bonuses that can be won by the player, starting from the lowest primary bonus in the pay table.

Accordingly, the probability of winning each available primary bonus, including the highest primary bonus of 250 credits per active payline, successively increases for each SIDEKICK symbol in the start-bonus outcome. Specifically, if the start-bonus outcome includes no SIDEKICK symbols, the player has a 1 in 8 probability of winning each of the primary bonuses of 250, 200, 150, 100, 80, 70, 50, and 30 credits per active payline; if the start-bonus outcome includes one SIDEKICK symbol, the player has a 1 in 7 probability of winning each of the primary bonuses of 250, 200, 150, 100, 80, 70, and 50 credits per active payline (30 credits not available); if the start-bonus outcome includes two SIDEKICK symbols, the player has a 1 in 6 probability of winning each of the primary bonuses of 250, 200, 150, 100, 80, and 70 credits per active payline (30 and 50 credits not available); and, finally, if the start-bonus outcome includes three SIDEKICK symbols, the player has a 1 in 5 probability of winning each of the primary bonuses of 250, 200, 150, 100, and 80 credits per active payline (30, 50, and 70 credits not available).

Figure 9:
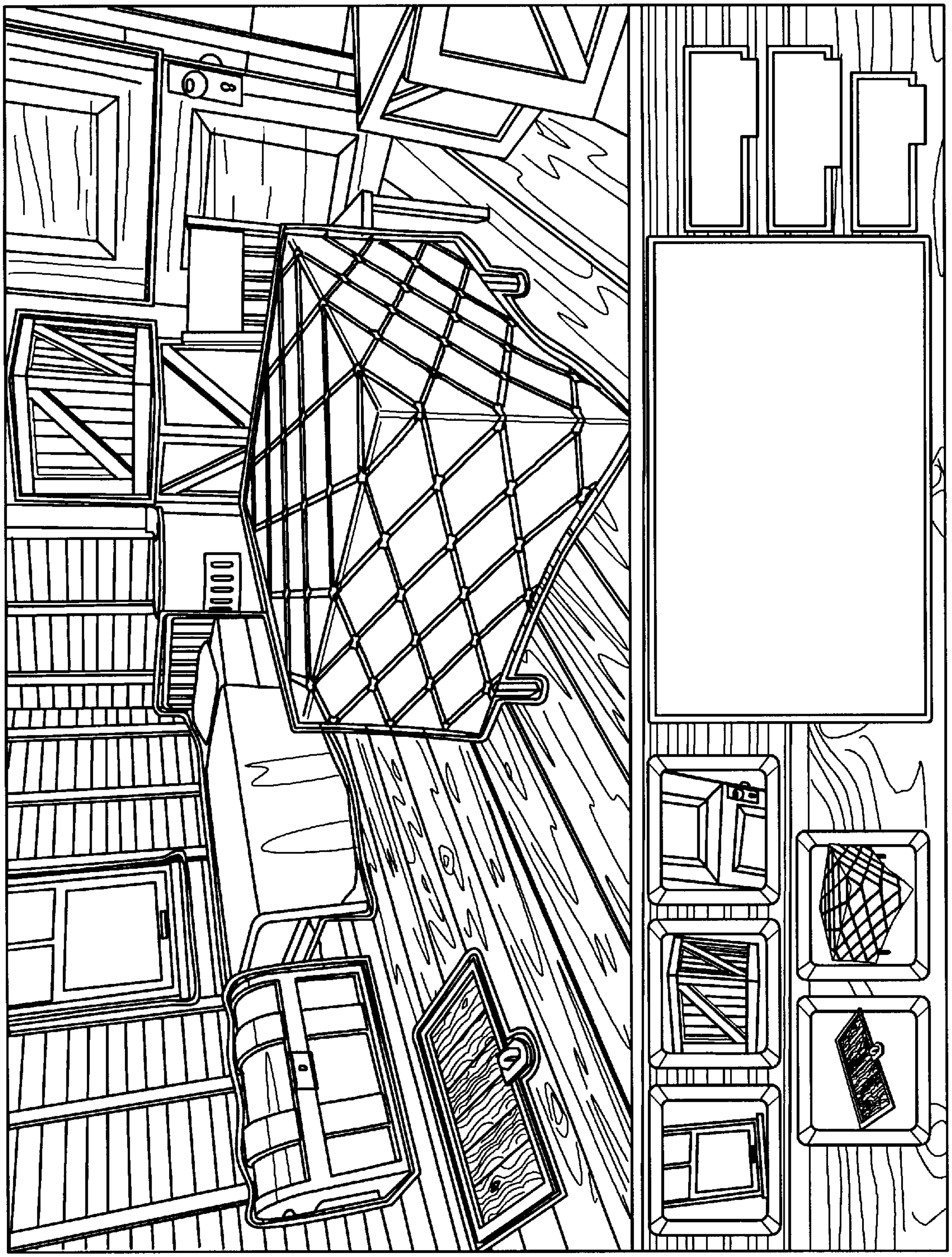

Referring now to FIG. 11, there is shown a multiplier table for the bonus payout multiplier for finding the hiding place of the guilty character in the hideout shown in the display screen capture in FIG. 9. The multiplier is based on the number of selections required to find the hiding place of the guilty character. The fewer the number of selections it takes the player to find the hiding place, the greater the bonus payout multiplier. If a player finds the hiding place with his or her first selection, the total bonus payout to that point in the game is multiplied by 8; if the player finds the hiding place with his or her second selection, the total bonus payout is multiplied by 5; if the player finds the hiding place with his or her third selection, the total bonus payout is multiplied by 4; and so on.

In the illustrated embodiment, the number of selectable hiding places is not affected by the number of SIDEKICK symbols appearing in the start-bonus outcome. Therefore, the player has a 1 in 5 probability of winning each of the multipliers of X8, X5, X4, X3, and X2, regardless of the number of SIDEKICK symbols appearing in the start-bonus outcome.

In an alternative embodiment, the number of selectable hiding places is reduced by one for each SIDEKICK symbol appearing in the start-bonus outcome, and, therefore, the number of available multipliers is reduced by one, starting from the lowest multiplier appearing in the multiplier table, for each SIDEKICK symbol appearing in the start-bonus outcome. Accordingly, the probability of winning each available multiplier, including the highest multiplier of X8, successively increases for each SIDEKICK symbol in the start-bonus outcome.

While the present invention has been described with reference to one or more particular embodiments, those skilled in the art will recognize that many changes may be made thereto without departing from the spirit and scope of the present invention. For example, the basic game need not comprise a spinning reel slot machine game as illustrated in FIG. 1, but may comprise virtually any type of game of chance or skill or combination of games having outcomes (e.g., start-bonus outcomes) that trigger play of a bonus game on the video display 12. For example, the basic game may comprise a video poker or video blackjack game. The basic game may itself be implemented on the video display 12 or a separate video display. In embodiments where both the basic and bonus games are implemented in video, each game may be shown on the same video display 12. Each of these embodiments and obvious variations thereof is contemplated as falling within the spirit and scope of the claimed invention, which is set forth in the following claims.

What is claimed is:

1. A gaming machine comprising:

a basic game controlled by a processor in response to a wager amount, said basic game having a plurality of different start-bonus outcomes; and a bonus game activated by said start-bonus outcomes which cause said processor to shift operation from said basic game to said bonus game, said bonus game capable of providing a plurality of bonus payouts, a probability of winning certain ones of said bonus payouts varying in response to said different start-bonus outcomes that activate said bonus game.

2. The gaming machine of claim 1 wherein said basic game includes a spinning reel display showing a plurality of symbols on each of a plurality of rotatable reels.

3. The gaming machine of claim 2 wherein said start-bonus outcomes include predetermined combinations of start-bonus symbols on said reels.

4. The gaming machine of claim 3 wherein said start-bonus symbols include first start-bonus symbols and second start-bonus symbols, one of said predetermined combinations including only said first start-bonus symbols and another of said predetermined combinations including at least one of said second start-bonus symbols.

5. The gaming machine of claim 4 wherein said plurality of bonus payouts vary from a minimum payout to a maximum payout, the probability of winning said maximum payout in said bonus game being greater when said bonus game is activated by said another of said predetermined combinations than when said bonus game is activated by said one of said predetermined combinations.

6. The gaming machine of claim 5 wherein said bonus game is capable providing said minimum payout when said bonus game is activated by said one of said predetermined combinations, said bonus game being incapable of providing said minimum payout when said bonus game is activated by said another of said predetermined combinations.

7. The gaming machine of claim 6 wherein when said bonus game is activated by said another of said predetermined combinations said bonus game is incapable providing a number of said bonus payouts, starting with said minimum payout and successively increasing therefrom, equal to a number of said second start-bonus symbols appearing in said another of said predetermined combinations starting from said minimum payout.

8. The gaming machine of claim 5 wherein when said bonus game is activated by said another of said predetermined combinations, said bonus game is incapable providing a number of said bonus payouts equal to a number of said second startbonus symbols appearing in said another of said predetermined combinations.

9. The gaming machine of claim 1 wherein said plurality of bonus payouts vary from a minimum payout to a maximum payout, the probability of winning said maximum payout in said bonus game being greater when said bonus game is activated by one of said start-bonus outcomes than when said bonus game is activated by another of said start-bonus outcomes.

10. The gaming machine of claim 9 wherein said bonus game is capable providing said minimum payout when said bonus game is activated by said another of said start-bonus outcomes, said bonus game being incapable of providing said minimum payout when said bonus game is activated by said one of said start-bonus outcomes.

11. A gaming machine comprising:

a basic game controlled by a processor in response to a wager amount, said basic game having a start-bonus outcome; and a bonus game activated by said start-bonus outcome which causes said processor to shift operation from said basic game to said bonus game, said bonus game including a video-type display controlled by said processor and displaying a plurality of player-selectable elements, at least one of said player-selectable elements representing a winning bonus game outcome, others of said player-selectable elements representing non-winning bonus game outcomes, said player-selectable elements being successively selected by a player until said one of said player-selectable elements is selected, said bonus game awarding said player a bonus payout in response to said one of said player-selectable elements being selected, said bonus payout successively decreasing in value in response to said player successively selecting said others of said player-selectable elements prior to selecting said one of said player-selectable elements.

12. The gaming machine of claim 11 wherein said bonus payout varies from a minimum value to a maximum value, said bonus payout successively decreasing from said maximum value toward said minimum value in response to said player successively selecting said others of said player-selectable elements prior to selecting said one of said player-selectable elements.

13. The gaming machine of claim 11 wherein said basic game includes a plurality of different start-bonus outcomes for activating said bonus game, and wherein said bonus payout can have a plurality of bonus values, a probability of winning certain ones of said bonus values varying in response to said different start-bonus outcomes that activate said bonus game.

14. The gaming machine of claim 11 wherein said bonus game occasionally awards said player a supplemental bonus payout in response to said one of said player-selectable elements being selected.

15. The gaming machine of claim 11 wherein said bonus game occasionally displays a plurality of second player-selectable elements on said video-type display in response to said one of said player-selectable being selected, at least one of said second player-selectable elements representing a second winning bonus game outcome, others of said second player-selectable elements representing non-winning bonus game outcomes, said second player-selectable elements being successively selected by said player until said one of said second player-selectable elements is selected, said bonus game awarding said player a second bonus payout in response to said one of said second player-selectable elements being selected, said second bonus payout successively decreasing in value in response to said player successively selecting said others of said second player-selectable elements prior to selecting said one of said second player-selectable elements.

16. A method of operating a gaming machine under control of a processor comprising:

providing a basic game having a plurality of different start-bonus outcomes;

placing a wager amount on said basic game;

playing said basic game;

providing a bonus game in response to said start-bonus outcomes, said bonus game capable of providing a plurality of bonus payouts, a probability of winning certain ones of said bonus payouts varying in response to said different start-bonus outcomes that activate said bonus game; and playing said bonus game.

17. The method of claim 16 wherein said basic game includes a spinning reel display showing a plurality of symbols on each of a plurality of rotatable reels.

18. The method of claim 17 wherein said start-bonus outcomes include predetermined combinations of start-bonus symbols on said reels.

19. The method of claim 18 wherein said start-bonus symbols include first start-bonus symbols and second start-bonus symbols, one of said predetermined combinations including only said first start-bonus symbols and another of said predetermined combinations including at least one of said second start-bonus symbols.

20. The method of claim 19 wherein said plurality of bonus payouts vary from a minimum payout to a maximum payout, the probability of winning said maximum payout in said bonus game being greater when said bonus game is activated by said another of said predetermined combinations than when said bonus game is activated by said one of said predetermined combinations.

21. The method of claim 20 wherein said bonus game is capable providing said minimum payout when said bonus game is activated by said one of said predetermined combinations, said bonus game being incapable of providing said minimum payout when said bonus game is activated by said another of said predetermined combinations.

22. The method of claim 20 wherein when said bonus game is activated by said another of said predetermined combinations, said bonus game is incapable providing a number of said bonus payouts equal to a number of said second start-bonus symbols appearing in said another of said predetermined combinations.

23. The method of claim 21 wherein when said bonus game is activated by said another of said predetermined combinations said bonus game is incapable providing a number of said bonus payouts, starting with said minimum payout and successively increasing therefrom, equal to a number of said second start-bonus symbols appearing in said another of said predetermined combinations starting from said minimum payout.

24. The method of claim 16 wherein said plurality of bonus payouts vary from a minimum payout to a maximum payout, the probability of winning said maximum payout in said bonus game being greater when said bonus game is activated by one of said start-bonus outcomes than when said bonus game is activated by another of said start-bonus outcomes.

25. The method of claim 24 wherein said bonus game is capable providing said minimum payout when said bonus game is activated by said another of said start-bonus outcomes, said bonus game being incapable of providing said minimun payout when said bonus game is activated by said one of said start-bonus outcomes.

* * * * *

UNITED STATES PATENT AND TRADEMARK OFFICE

CERTIFICATE OF CORRECTION

PATENT NO. : 6.159,097

DATED : December 12, 2000

INVENTOR(S) : Gura

It is certified that error appears in the above-identified patent and that said Letters Patent is hereby corrected as shown below:

Column 9, claim 6, line 12, after "capable" insert --of--

Column 9, claim 7, line 19, after "incapable" insert --of--

Column 9, claim 8, line 27, after "incapable" insert --of--

Column 9, claim 10, line 39, after "capable" insert --of--

Column 10, claim 15, line 20, after "player-selectable" insert --elements--

Column 10, claim 21, line 67, after "capable" insert --of--

Column 11, claim 22, line 7, after "incapable" insert --of--

Column 11, claim 23, line 13, after "incapable" insert --of--

Column 12, claim 25, line 11, after "capable" insert --of--

Signed and Sealed this

Twenty-second Day of May, 2001

*Attest:*

Nicholas P. Godici

NICHOLAS P. GODICI

*Attesting Officer*

*Acting Director of the United States Patent and Trademark Office*